United States Patent [19]

Rosenberg

[11] Patent Number: 4,949,747
[45] Date of Patent: Aug. 21, 1990

[54] SELF-FLUSHING FLUID APPARATUS PARTICULARLY USEFUL IN PULSATOR DEVICES

[76] Inventor: Peretz Rosenberg, Beit Shaareem, Israel

[21] Appl. No.: 411,986

[22] Filed: Sep. 25, 1989

[30] Foreign Application Priority Data

Oct. 12, 1988 [IL] Israel .................................... 88014

[51] Int. Cl.⁵ ............................................. F16K 51/00
[52] U.S. Cl. ................................... 137/107; 137/238; 137/624.14
[58] Field of Search ................ 137/15, 102, 107, 238, 137/513.5, 624.14, 517; 239/113

[56] References Cited

U.S. PATENT DOCUMENTS

| | | | |
|---|---|---|---|
| 3,477,613 | 11/1969 | Mangel | 137/624.14 |
| 4,244,526 | 1/1981 | Arth | 137/517 |
| 4,704,947 | 11/1987 | Schneider | 137/517 X |
| 4,781,217 | 11/1988 | Rosenberg | 137/536 X |

FOREIGN PATENT DOCUMENTS 2116293 9/1983 United Kingdom ............. 137/513.5

Primary Examiner—Robert G. Nilson
Attorney, Agent, or Firm—Benjamin J. Barish

[57] ABSTRACT

A self-flushing fluid apparatus includes a flow-control device between the housing inlet port and an inlet fitting connected to it, which device has two relatively movable flow-control members controlling the flow of the fluid into the housing. The flow control device includes two assemblies each including one of the flow-control members and a spring between the two assemblies and effective: (a) in the presence of pressurized fluid at the inlet fitting to move the two flow-control members to an operative position with respect to each other to control the flow of the fluid from the inlet fitting into the housing; and (b) in the absence of pressurized fluid at the inlet fitting to move the two flow-control members to an inoperative position away from each other, and thereby to produce a self-flushing of the flow-control device by the pressurized fluid in the housing.

18 Claims, 2 Drawing Sheets

FIG 1
FIG 3
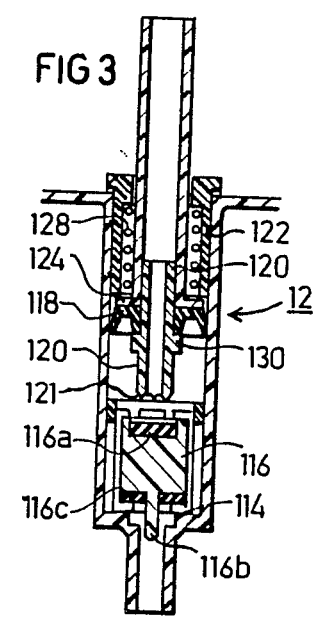
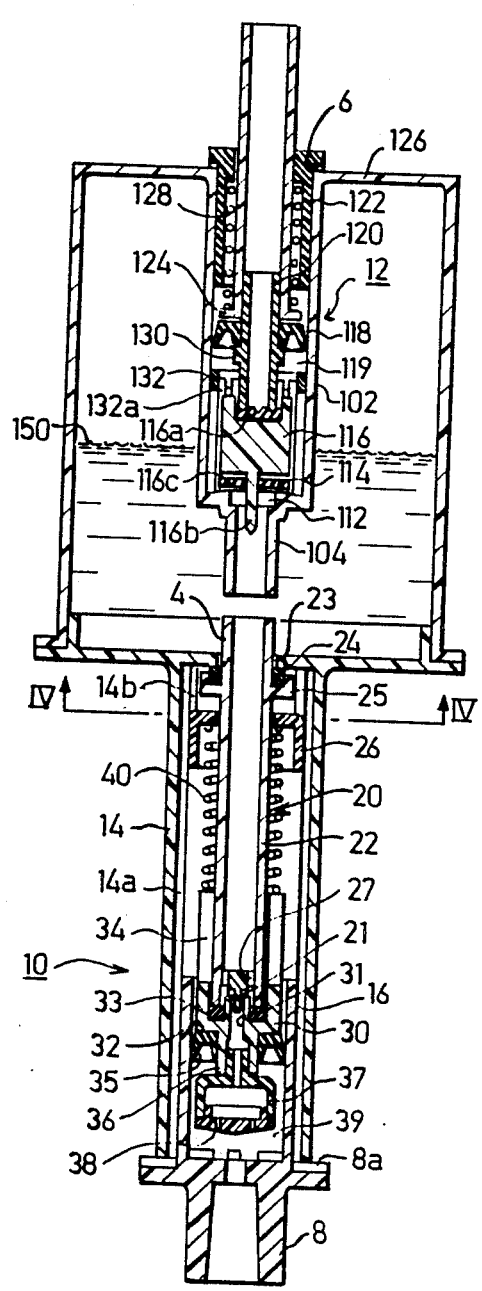
FIG 2

FIG 4
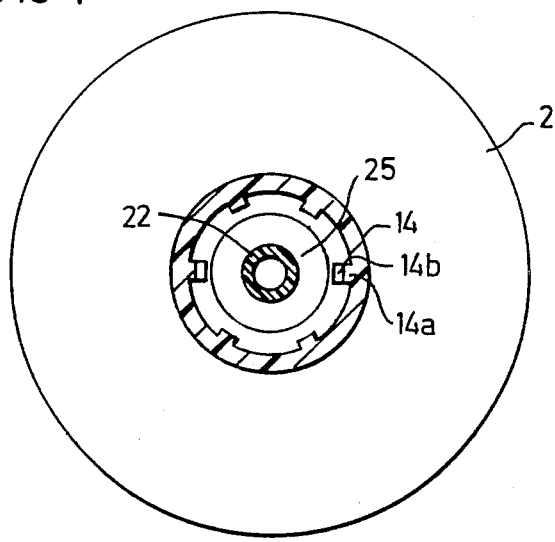
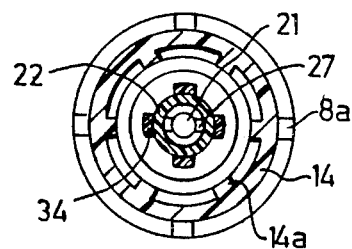
FIG 5

SELF-FLUSHING FLUID APPARATUS PARTICULARLY USEFUL IN PULSATOR DEVICES

FIELD AND BACKGROUND OF THE INVENTION

The present invention relates to self-flushing fluid apparatus. The invention is particularly useful in a pulsator device, such as described in my U.S. Pat. No. 4,781,217, and is therefore described below with respect to this application, but it will be appreciated that the invention could advantageously be used in many other applications.

Pulsator devices, such as described in the above-cited patent, include a housing having an inlet port formed with a restricted inlet orifice for receiving fluid in a continuous manner and at a relatively low rate, and an outlet port formed with a larger orifice controlled by an outlet valve which opens at a relatively high pressure and closes at a relatively low pressure. Thus, fluid may be continuously introduced at a low rate into the housing, thereby increasing the pressure within the housing until the outlet valve opens, at which time the outlet valve opens to discharge the fluid until the pressure within the housing drops to the predetermined low value, when the outlet valve recloses. Such pulsator devices are used, among other applications, in water irrigation systems to enable sprinklers and other irrigation devices to be fed with water continuously at a relatively low rate but to discharge the water periodically at a relatively high rate.

OBJECTS AND SUMMARY OF THE INVENTION

An object of the present invention is to provide fluid apparatus of this type, but also suitable for other types, with a self-flushing feature effective to automatically flush the apparatus by merely turning-off the supply fluid.

According to the present invention, there is provided self-flushing fluid apparatus, comprising a housing having an inlet port for receiving fluid under pressure, and an outlet port for discharging the fluid therefrom under pressure; an inlet fitting connected to the inlet port for feeding pressurized fluid therethrough into the housing; and a flow-control device between the inlet port and the inlet fitting, and including two relatively movable flow-control members controlling the flow of the fluid from the inlet fitting into the housing. The flow control device comprises a first assembly including one of the flow-control members, a second assembly including the other of the flow-control members, and a spring between the two assemblies and effective:

(a) in the presence of pressurized fluid at the inlet fitting, to permit one assembly to be displaced in one direction with respect to the other assembly, to move the two flow-control members to an operative position with respect to each other to control the flow of the fluid from the inlet fitting into the housing; and (b) in the absence of pressurized fluid at the inlet fitting, to displace one assembly with respect to the other assembly in the opposite direction to move the two flow-control members to an inoperative position away from each other, and thereby to produce a self-flushing of the flow-control device by the pressurized fluid in the housing.

In the preferred embodiment of the invention described below, the two flow-control members in the two assemblies define a restricted inlet orifice when in their operative positions; more particularly, one of the flow-control members is formed with an opening, and the other flow-control member includes a pin of smaller diameter than the opening and receivable therein in the operative positions of the two assemblies.

According to another important feature in the described preferred embodiment, the first assembly comprises a tube having one end of smaller diameter than, and receivable in, the inlet port of the housing to define a clearance therebetween, and carrying a sealing ring for sealing the clearance port; the first assembly being displaceable by the spring such that in the presence of pressurized fluid at the housing inlet port, the sealing ring seals the clearance between the tube and the inlet port, but in the absence of pressurized fluid at the housing inlet port, the sealing ring opens the clearance between the tube and inlet port to permit the pressurized fluid within the housing also to be discharged through the clearance.

As indicated above, the invention is described herein with respect to pulsator devices wherein the housing includes a chamber for pressurizing the fluid fed into the housing, and a valve connected to the outlet port of the housing, which valve opens at a high pressure and closes at a lower pressure to thereby output the fluid from the housing in the form of pulses.

It will thus be seen that the described pulsator device, or other device incorporating the foregoing features, can be automatically flushed by merely shutting-off the fluid (e.g., water) supply. This feature is particularly advantageous when the invention is embodied in a pulsator-type water irrigation system wherein individual water-irrigation devices, or lines of water-irrigation devices, are each supplied with one of the pulsator devices so that all may be cleaned simultaneously by merely turning-off the water supply to such devices from a central location.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a longitudinal sectional view illustrating one form of self-flushing apparatus, namely a pulsator device, constructed in accordance with the present invention, the apparatus being shown in its operative condition while pressurized water is supplied thereto;

FIG. 2 illustrates the inlet assembly in the apparatus of FIG. 1, the parts being shown in their non-operative positions wherein pressurized water is not supplied to the apparatus;

FIG. 3 is a longitudinal sectional view illustrating the outlet valve assembly in the apparatus of FIG. 1, the parts being shown in the open position of the valve;

FIG. 4 is a sectional view along line IV—IV of FIG. 1; and

FIG. 5 is a sectional view along line V—V of FIG. 2.

DESCRIPTION OF A PREFERRED EMBODIMENT

As indicated above, the apparatus illustrated in the drawings is a pulsator device which receives water continuously at a relatively low rate, and discharges the water periodically in the form of pulses at a relatively high rate, such as are used in water irrigation systems. Briefly, the apparatus comprises a housing 2 having an inlet port 4 for receiving water under pressure continuously at a low rate, and an outlet port 6 for discharging the water periodically in the form of pulses. The apparatus further includes an inlet fitting 8 at the inlet side of the housing, and a flow-control device, generally designated 10, between the inlet fitting 8 and the inlet port 4. As will be described more particularly below, the flow-control device 10 includes two relatively movable flow-control members defining a restricted inlet orifice for inletting the water into housing 2 at a relatively low rate. The outlet port 6 of the housing is occupied by an outlet valve assembly, generally designated 12, which opens at a high pressure and closes at a lower pressure in order to discharge the water from the housing in the form of pulses.

Flow-control device 10 coupled to the inlet port 4 of housing 2 is enclosed by a sleeve 14 integrally formed with the bottom wall of housing 2 around its inlet port 4. In addition, the inlet fitting 8, for connection to a source of pressurized water, is formed with another sleeve 16 received within sleeve 14. The inner face of sleeve 14 includes a plurality of ribs 14a extending the complete length of the sleeve and spaced around its circumference for spacing sleeve 14 from sleeve 16. The upper end of sleeve 14 includes a plurality of further, shorter ribs 14b, for a purpose to be described below. In addition, inlet fitting 8 is formed with a plurality of radially-extending ribs 8a engageable with the end of sleeve 14, and with a further plurality of ribs 8b, both for reasons also to be described below.

FIG. 1 illustrates the flow-control device 10 at the inlet port of the housing 2 in the operative positions of the respective parts, i.e., when pressurized fluid is being supplied to the housing via inlet fitting 8. FIG. 2 illustrates the parts of the flow-control device 10 in their non-operative positions, that is when no pressurized water is supplied to the device. FIG. 1 also illustrates the outlet valve assembly 12 in its closed condition, whereas FIG. 3 illustrates it in its open condition.

The flow-control device 10 comprises: a first assembly, generally designated 20, including one of the flow-control members, namely a pin 21 of the restricted inlet orifice; and a second assembly, generally designated 30, including the other flow-control member, namely an opening 31, of the restricted inlet orifice. Both assemblies 20 and 30 are displaceable with respect to sleeves 14 and 16, and also with respect to each other. The two assemblies are urged to their non-operative positions illustrated in FIG. 2 by a spring, generally designated 40, but are displaceable to their operative positions as illustrated in FIG. 1 by the pressure of the water when pressurized water is supplied to the inlet fitting 8.

Pin 21 of displaceable assembly 20 is of smaller diameter than that of opening 31 of the displaceable assembly 30, so that when the pin is received within the opening, in the operative positions of the two assemblies as illustrated in FIG. 1, there is a clearance or space between the pin and the sides of the opening. This clearance defines the cross-section of the restricted inlet orifice, and thereby determines the rate of inletting of the water into housing 2. For example, the diameter of pin 21 may be 1.0 mm, and the diameter of opening 31 may be 1.2 mm, in which case the water, at a pressure of about 2.0 atmospheres will be inletted into housing 2 at a rate of about 5 liters per hour.

When the pressure applied to the inlet fitting 8 is terminated, spring 40 causes the two assemblies 20, 30 to be moved apart, as shown in FIG. 2, moving pin 21 of assembly 20 away from opening 31 of assembly 30. This permits the pressurized water within housing 2 to be discharged under pressure through the fluid control device 10 and thereby to flush out any dirt particles that may have accumulated therein, as will be described more particularly below.

Pin 21 of assembly 20 is carried at one end of a tube 22. The opposite end of the tube is received within the inlet port 4 of housing 2. The respective end of tube 22 is of smaller diameter than the inlet port 4, so that a clearance or space 23 is defined between the two. In the operative position of the flow-control device 10, clearance 23 is closed by a sealing ring 24 received in an annular flange 25 integrally formed with tube 22.

Displaceable assembly 20 further includes a collar 26 freely receivable over tube 22, and adapted to receive one end of spring 40. The opposite end of spring 40 abuts against a part of the displaceable assembly 30, as will be described below. Ribs 14b formed on the inner face on the upper end of sleeve 14 serve as a stop for collar 26.

Pin 21 may be integrally formed with tube 22 of assembly 20. Tube 22 is formed with passageways 27 on opposite sides of the pin to permit the water flowing through the restricted inlet orifice, defined by the space between pin 21 and opening 30, to flow through tube 22 into the interior of housing 2.

With respect to displaceable assembly 30, its opening 31, defining the restricted inlet orifice with pin 21, is formed through a disc-shaped member 32 which receives a sealing ring 33 engageable with the end of tube 22 of assembly 20 in the operative positions of the two assemblies, as illustrated in FIG. 1. Displaceable assembly 30 further includes a plurality of fingers 34 extending axially and spaced circumferentially so as to enclose tube 22 of assembly 20. Fingers 34 are in light frictional contact with the outer face of tube 22 so as to be guide the movement of the tube.

Displaceable assembly 30 further includes a sealing ring 35 received over a stem 36 depending from disc 32, and slidably engaging the inner face of sleeve 16 of the inlet fitting 8. Stem 36 is further formed with an opening communicating with the orifice-defining opening 31 and frictionally receiving a filter member 37 formed with a plurality of openings 38 for filtering out any solid particles in the water supply. The solid particles accumulate in inlet chamber 39. Ribs 8b prevent the filter member 37 from blocking the inlet opening in the inlet fitting 8.

The outlet valve assembly 12 may be of any suitable construction which opens at a high pressure and closes at a lower pressure, so as to outlet the water from housing 2 in the form of pulses. For purposes of example, outlet valve 12 illustrated in FIGS. 1 and 3 is basically of the constructions illustrated in my U.S. Pat. No. 4,889,154 of Dec. 26, 1989.

Thus, the illustrated outlet valve assembly 12 comprises a cylindrical housing 102 reduced in diameter at one end to define an inlet 104. The juncture between the valve housing 102 and its inlet 104 defines a valve opening 112 circumscribed by a valve seat 114 controlled by a valve member 116. Valve member 116 includes a resilient disc 116a on its upper face, a stem 116b depending from its lower face, and a sealing ring 116c enclosing stem 116b and adapted to contact valve seat 114 in the closed condition of the valve as illustrated in FIG. 1.

A piston 118 is disposed within valve housing 102 and defines a chamber 119 between it and the resilient disc 116a at the outlet face of valve member 116. Piston 118 is formed with a central opening defining a passageway which receives a spacer stem 120 formed with spacer ribs 121 (FIG. 3) at its inner end. Spacer stem 120 is in turn received within a cylindrical sleeve 122 formed with an annular flange 124 at one end in contact with piston 118. The opposite end of sleeve 122 projects through the outlet port 106 of housing 2. A light spring 128 is interposed between flange 124 and the end wall 126 of housing 2.

The outer diameter of piston 118 is substantially larger than the diameter of valve seat 114 closed by valve member 116. This causes the valve to open at a relatively high inlet pressure determined by the cross-sectional area of valve seat 114, and to close at a substantially smaller inlet pressure determined by the larger cross-sectional area of piston 118.

Piston 118 is fixed between annular flange 124 of sleeve 122 and an annular flange 130 formed on spacer stem 120, so that the spacer stem, piston, and sleeve all move together as a unit by the inlet pressured applied to inlet 104. Valve member 116 also tends to move by this inlet pressure, but its movement is limited by a limit ring 132 frictionally received within the valve housing 102. The lower surface of limit ring 132 is formed with a plurality of spaced fingers 132a engageable with the upper face of valve member 116 to maintain a fluid passageway to chamber 119 even when sleeve 122 is seated against resilient disc 116a of the valve member.

The apparatus in the drawings operates as follows:

At the start, it will be assumed that housing 2 is empty, so that the outlet valve assembly 12 is in its closed condition, as illustrated in FIG. 1, under the action of spring 128. If pressurized water is not supplied to the inlet fitting 8, the parts of the water-control device 10 will be as shown in FIG. 2, wherein spring 40 urges disc 32 of assembly 30, containing the orifice opening 31, away from pin 21 of assembly 20, so that this pin and opening are no longer effective to define the inlet restrictive orifice.

When pressurized water is applied to inlet fitting 8, the pressure of the water moves assembly 30 towards assembly 20 until tube 22 of assembly 20 engages sealing ring 33 of assembly 30, whereupon assembly 20 is also moved until its sealing ring 24 engages the inner face of the bottom wall of housing 2 around its inlet port 4, as shown in FIG. 1. It will be seen that in this position of the fluid control device 10, pin 21 is received within opening 31 so as to make effective the restrictive orifice defined by this pin and opening; the water is thus inletted into the interior of housing 2, via filter 37 and the interior of tube 22, at the lower rate determined by this restrictive orifice. Filter 37 separates any solid particles from the water, which solid particles accumulate within chamber 39.

As housing 2 is thus continuously filled at the slow-restricted rate, the pressure within the housing increases as the water level within the housing rises, until the pressure reaches a predetermined maximum value, at the level indicated at 150 in FIG. 1, whereupon the outlet valve assembly 12 opens to discharge a quantity of the water within the housing. This causes the pressure within the housing to drop, and when it drops to a predetermined low value, valve assembly 12 closes, terminating the discharge of the water and permitting the water level and the pressure within the housing 2 again to start to rise.

More particularly, the operation of the outlet valve assembly 12 is as follows:

In the absence of pressure within housing 2, spring 128 urges the piston 118 and valve member 116 to their closed positions with respect to valve seat 114, as shown in FIG. 1. As the pressure within housing 2 increases, the pressure applied to valve member 116 increases, and when this inlet pressure, multiplied by the cross-sectional area of the inlet valve seat 114, is sufficient to overcome the force of spring 128, valve member 116 moves to its open position. This immediately applies the inlet pressure, via chamber 119, to piston 118 which, having a larger cross-sectional area than valve seat 114, applies an increased opening force to the piston and sleeve 120, until both the piston and sleeve are moved to their fully-open position illustrated in FIG. 3.

Because of the large force produced by the inlet pressure against piston 118, the valve will remain open until the inlet pressure drops to such a low value that it, multiplied by the larger surface area of piston 118, is no longer able to overcome the force of spring 128. At this time spring 128 moves the piston 118 and its sleeve 122 towards the valve member 116, and the valve member 116 towards valve seat 114 to close the inlet valve.

As one example, the valve assembly can be designed to open at a pressure of 1.5 atmospheres, and close at a pressure of 0.5 atmospheres.

It will thus be seen that the illustrated apparatus will continuously feed water at a low rate, determined by the orifice defined by pin 21 and opening 31, into housing 2; and the outlet valve assembly 12 within the housing will periodically discharge the water in the form of pulses.

During the operation of the apparatus, solid particles within the water supply separated by filter 37 will tend to accumulate within chamber 39 of the flow control device 10, thereby tending to clog the apparatus and to reduce the rate of inletting of the water into housing 2. In addition, some solid particles passing through filter 37 will tend to accumulate in the bottom of housing 2. These particles may be flushed out from both housing 2 and the flow-control device 10 whenever desired by merely turning-off the supply of water.

Thus, when the water supply to the inlet fitting 8 is no longer pressurized, spring 40 moves the parts to their positions as illustrated in FIG. 2, wherein opening 31 in disc 32 of displaceable assembly 30 is moved away from pin 21 of displaceable assembly 20, thereby opening up the restrictive inlet orifice. In addition, tube 22 of displaceable assembly 20 is moved inwardly of sleeve 14 by gravity to cause its sealing ring 24 to disengage the inner face of the bottom wall of housing 2, thereby opening the clearance 23 between the tube and the inlet port 4 of the housing.

As the restrictive inlet orifice defined by pin 21 and opening 31 is thus opened, the pressurized water within housing 2 is discharged through clearance 23, the space between ribs 14b on the inner sleeve 14 and tube 22 on outer sleeve 16, and through the passageways between spacing ribs 14a and 8a to the outside. Some water will flush through tube 22 and passageway 27 around pin 21, between fingers 34 outside of sleeve 16, and through spacing ribs 14a, 8a to the outside. Any dirt settling in inlet chamber 39 will be flushed out during the next opening of the valve.

While the invention has been described with respect to one preferred embodiment, namely involving a pulsator application, it will be appreciated that the invention could advantageously be used in many other applications involving a housing receiving fluid under pressure whenever it is desired to flush-out the housing and its inlet connections automatically by merely shutting off the supply of the pressurized fluid. Also, while the invention has been described with respect to a specific construction of a fluid control device thorough which the fluid is inletted into the housing, it will appreciated that many other variations and modifications of such a fluid control device may be made.

What is claimed is:

1. A self-flushing fluid apparatus, comprising:
   a housing having an inlet port for receiving fluid under pressure, and an outlet port for discharging the fluid therefrom under pressure;
   an inlet fitting connected to said inlet port for feeding pressurized fluid therethrough into said housing;
   and a restricted inlet orifice between said inlet port and said inlet fitting, and including two relatively movable flow-control members restricting the flow of the fluid from said inlet fitting into said housing; said restricted inlet orifice comprising a first assembly including one of said flow-control members, a second assembly including the other of said flow-control members, and a spring between the two assemblies and effective:
   (a) in the presence of pressurized fluid at the inlet fitting, to permit one assembly to be displaced in one direction with respect to the other assembly, to move the two flow-control members to an operative positive with respect to each other to restrict the flow of the fluid from the inlet fitting into the housing; and
   (b) in the absence of pressurized fluid at the inlet fitting, to displace one assembly with respect to the other assembly in the opposite direction to move the two flow-control members to an inoperative position spaced away from each other, and thereby to produce a self-flushing of the restricted inlet orifice by the pressurized fluid in the housing.

2. The apparatus according to claim 1, wherein one of said flow-control members is formed with an opening, and the other flow-control member includes a pin of smaller diameter than said opening and receivable therein in the operative position of the two assemblies.

3. The apparatus according to claim 1, wherein said first assembly comprises a tube having one end of smaller diameter than, and receivable in, said inlet port of the housing to define a clearance therebetween, and carrying a sealing ring for sealing said clearance; said first assembly being displaceable by said spring such that in the presence of pressurized fluid at the inlet fitting, said sealing ring seals the clearance between said tube and the inlet port, but in the absence of pressurized fluid at the inlet fitting, said sealing ring opens said clearance to permit the pressurized fluid within the housing also to be discharged through said clearance.

4. The apparatus according to claim 3, wherein the opposite end of said tube in said first assembly carries one of said flow-control members.

5. The apparatus according to claim 3, wherein said first assembly further includes a collar freely mounted on said tube at said one end thereof for receiving one end of said spring.

6. The apparatus according to claim 3, wherein said inlet fitting includes a first sleeve circumscribing said first and second assemblies, and said housing includes a second sleeve enclosing the first sleeve of the inlet tube and also enclosing said first and second assemblies; said two sleeves being formed with spacing ribs between them to outlet the fluid discharged from the housing through the space between the housing inlet port and the tube of said first assembly.

7. The apparatus according to claim 6, wherein said second assembly is also displaceable and includes a slidable sealing ring engageable with the inner face of the inlet fitting sleeve.

8. The apparatus according to claim 7, wherein one end of said second assembly further includes a plurality of fingers enclosing the tube of the first assembly and guiding its movements during the displacement of the first assembly.

9. The apparatus according to claim 8, wherein the opposite end of said second assembly carries said other flow-control member, and a sealing ring circumscribing said other flow-control member and engageable with the end of said tube of the first assembly in the operative positions of the two assemblies.

10. The apparatus according to claim 1, wherein said housing includes a chamber for pressurizing the fluid fed into the housing, and a valve connected to the outlet port of the housing, which valve opens at a high pressure and closes at a lower pressure to thereby output the fluid from the housing in the form of pulses.

11. A self-flushing fluid apparatus, comprising:
    a housing having an inlet port for receiving water under pressure, and an outlet port for discharging the water therefrom under pressure;
    said housing including a chamber for pressurizing the water fed into the housing, and a valve connected to the outlet port of the housing, which valve opens at a high pressure and closes at a lower pressure to thereby output the water from the housing in the form of pulses;
    an inlet fitting connected to said inlet port for feeding pressurized water therethrough into said housing;
    and a flow-control device between said inlet port and said inlet fitting, and including two relatively movable flow-control members controlling the flow of the water from said inlet fitting into said housing; said flow control device comprising a first assembly including one of said flow-control members, a second assembly including the other of said flow-control members, and a spring between the two assemblies;
    said first assembly comprising a tube having one end of smaller diameter than, and receivable in, said inlet port of the housing to define a clearance therebetween, and carrying a sealing ring for sealing said clearance;
    said first assembly being displaceable by said spring such that in the presence of pressurized water at the inlet fitting, said sealing ring seals the clearance between said tube and the inlet port, but in the absence of pressurized water at the housing inlet port, said sealing ring opens said clearance to permit the pressurized water within the housing also to be discharged through said clearance.

12. The apparatus according to claim 11, wherein said two flow-control members in the two assemblies define a restricted inlet orifice when in their operative positions.

13. The apparatus according to claim 12, wherein one of said flow-control members is formed with an opening, and the other flow-control member includes a pin of smaller diameter than said opening and receivable therein in the operative positions of the two assemblies.

14. The apparatus according to claim 11, wherein said first assembly further includes a collar freely mounted on said tube at said one end thereof for receiving one end of said spring.

15. The apparatus according to claim 11, wherein said inlet fitting includes a first sleeve circumscribing said first and second assemblies, and said housing includes a second sleeve enclosing the first sleeve of the inlet tube and also enclosing said first and second assemblies; said two sleeves being formed with spacing ribs between them to outlet the water discharged from the housing through the space between the housing inlet port and the tube of said first assembly.

16. The apparatus according to claim 15, wherein said second assembly is also displaceable and includes a slidable sealing ring engageable with the inner face of the inlet fitting sleeve.

17. The apparatus according to claim 16, wherein one end of said second assembly further includes a plurality of fingers enclosing the tube of the first assembly and guiding its movements during the displacement of the first assembly.

18. The apparatus according to claim 17, wherein the opposite end of said second assembly carries said other flow-control member, and a sealing ring circumscribing said other flow-control member and engageable with the end of said tube of the first assembly in the operative positions of the two assemblies.

* * * * *